United States Patent
Matula et al.

(10) Patent No.: US 9,894,201 B1
(45) Date of Patent: Feb. 13, 2018

(54) ONGOING TEXT ANALYSIS TO SELF-REGULATE NETWORK NODE ALLOCATIONS AND CONTACT CENTER ADJUSTMENTS

(71) Applicant: AVAYA INC., Santa Clara, CA (US)

(72) Inventors: Valentine Matula, Granville, OH (US); David Skiba, Golden, CO (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/378,507

(22) Filed: Dec. 14, 2016

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC ....... *H04M 3/5141* (2013.01); *H04M 3/5191* (2013.01); *H04M 3/5233* (2013.01); *H04M 3/5235* (2013.01)

(58) Field of Classification Search
CPC ..... H04M 3/5233; H04M 3/5232; H04M 3/51
USPC ........... 379/265.09, 265.11, 265.12, 265.05, 379/265.01, 266.08
See application file for complete search history.

(56) References Cited

U.S. PATENT DOCUMENTS

| | | | |
|---|---|---|---|
| 6,614,903 | B1 | 9/2003 | Flockhart et al. |
| 8,488,772 | B2 | 7/2013 | Fagundes et al. |
| 8,634,543 | B2 | 1/2014 | Flockhart et al. |
| 8,964,958 | B2 | 2/2015 | Steiner |
| 9,008,283 | B2 | 4/2015 | Riahi et al. |
| 9,154,626 | B2 * | 10/2015 | Uba .................... H04M 3/5233 |
| 2010/0235218 | A1 | 9/2010 | Erhart et al. |
| 2011/0125793 | A1 | 5/2011 | Erhart et al. |
| 2011/0125826 | A1 | 5/2011 | Erhart et al. |
| 2013/0223608 | A1 | 8/2013 | Flockhart et al. |
| 2014/0188459 | A1 | 7/2014 | Fink et al. |
| 2014/0321633 | A1 | 10/2014 | Erhart et al. |
| 2015/0134325 | A1 | 5/2015 | Skiba et al. |
| 2017/0213171 | A1 * | 7/2017 | Dubash ............ G06Q 10/06313 |

* cited by examiner

*Primary Examiner* — Thjuan K Addy
(74) *Attorney, Agent, or Firm* — Sheridan Ross P.C.

(57) ABSTRACT

Contact center agents are often presented work items utilizing voice, video, and text. Text messages are often processed concurrently with other text or non-text messages. In order to avoid over or under utilizing agents, contact centers may determine an initial complexity for a work item and route the work item to an agent having the skills and capacity to accommodate the initial complexity. However, the initial complexity may differ from an observed complexity as the agent processes the work item. Accordingly, systems and methods are provided to monitor ongoing text message complexity and route subsequent work items to agents based on an observed complexity provided, at least in part, by the complexity of text-based work item current being processed, and the agents capacity to process the subsequent work item.

20 Claims, 4 Drawing Sheets

ONGOING TEXT ANALYSIS TO SELF-REGULATE NETWORK NODE ALLOCATIONS AND CONTACT CENTER ADJUSTMENTS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for electronic communication networks and particularly to routing an electronic communication to an endpoint.

BACKGROUND

Contact center agents today have to manage many channels of communication, including voice, video, text, etc. Each of these channels have built-in time requirements and expectations for service. Contact center service providers have developed ways to score and/or rank telephone calls based on customer attributes and call types (e.g., service, product information, web help, etc.), in order to appropriately and fairly choose agents and balance their workloads. With the addition of text-based solutions (e.g., short message service (SMS), social media chat, email, etc.) contact center management strives to fairly distribute the workload among its agents, such as to efficiently and effectively utilize the agents.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising a network interface; a processor; and the processor: receives a stream of work items via the network interface; determines a complexity, for a first work item of the stream of work items, to be a determined first initial complexity; routes the first work item to a first agent for processing, the first agent being selected from a pool of agents having a skill necessary to process the first work item and having a capacity to process the first work item, wherein the capacity is decremented by the first initial complexity for the first work item; monitors the first work item for an observed complexity different from the first initial complexity; upon determining the observed complexity differs from the first initial complexity, updates the capacity in accordance with the difference; routes a second work item to the first agent upon determining the first agent has a capacity to accept the second work item having a second initial complexity that is within the capacity; and routes the second work item to a second agent upon determining the second initial complexity is not within the capacity.

In another embodiment, a method is disclosed, comprising: receiving a stream of work items at a server from a network interface; determining a complexity, for a first work item of the stream of work items, to be a determined first initial complexity; routing the first work item to a first agent for processing, the first agent being selected from a pool of agents having a skill necessary to process the first work item and having a capacity to process the first work item, wherein the capacity is decremented by the first initial complexity for the first work item; monitoring the first work item for an observed complexity different from the first initial complexity; upon determining the observed complexity differs from the first initial complexity, updating the capacity in accordance with the difference; routing a second work item to the first agent upon determining the first agent has a capacity to accept the second work item having a second initial complexity that is within the capacity; and routing the second work item to a second agent upon determining the second initial complexity is not within the capacity.

In another embodiment, another method is disclosed, comprising: means for receiving a stream of work items via the network interface; means for determining a complexity, for a first work item of the stream of work items, to be a determined first initial complexity; means for routing the first work item to a first agent for processing, the first agent being selected from a pool of agents having a skill necessary to process the first work item and having a capacity to process the first work item, wherein the capacity is decremented by the first initial complexity for the first work item; means for monitoring the first work item for an observed complexity different from the first initial complexity; means for, upon determining the observed complexity differs from the first initial complexity, updating the capacity in accordance with the difference; means for routing a second work item to the first agent upon determining the first agent has a capacity to accept the second work item having a second initial complexity that is within the capacity; and means for routing the second work item to a second agent upon determining the second initial complexity is not within the capacity.

In another embodiment, a system is provided to enable contact centers a means to handle text chat workloads for agents. Text chat generally has a higher, but not unlimited, tolerance for response delays (e.g., the time that a customer sends a response until the agent responds). As a result, agents may process a plurality of messages simultaneously or, at least, overlapping. However, a work item may initially have a complexity determined as a general rule (e.g., customer average, origination location average, etc.), address utilized by a customer (e.g., "domesticflights@cjet.com," "lostbags@cjet.com," etc.), and/or an initial screening question, such as by an initial, often automated, text-based agent asking for a category of issues (e.g., "Click here if you would like to book a domestic flight," "Are you missing a bag?," etc.). A work item may then have a complexity assigned to it and an agent, having at least the skills required to process the work item, is selected to process the work item. The work item is then presented to the agent.

While text-based work items may be enqueued, often a plurality of work items are presented simultaneously to the agent. A feature that differs from voice-based work items as an agent either handles one call at a time or must place the call on hold to perform another task. However, with voice-based work items, a response threshold is more limited as the communication is performed in real-time. Managing voice-based calls simultaneously is exceptionally difficult if the agent has to remember specifics of one call, perform any actions needed, and respond back to a first customer all while performing the same acts for a second customer with a second work item. While simultaneous handling of two voice-based calls is exceptionally difficult, more than two is nearly impossible and, as a result, work items are abandoned and customer service suffers. As compared to voice-based work items, text-based work items have a greater response threshold. An agent may have a single work item active for several minutes to several days or even longer. However, text-based work items may have a longer response threshold but it is not unlimited. For example, once an agent has responded, the customer may be dissatisfied if the cadence of turns is not closer to real-time. In another example, the channel may have an implied degree of responsiveness that, if not met, also leads to customer dissatisfaction. For example, a large corporation may be known or suspected of monitoring a social media page, such as observing responses to previous posts on the social media page. If the last ten posts on the social media page received a reply within five minutes, another customer posting on the social media page may be unsatisfied if their post does not receive a response within a similar time. And, once started, customers may expect the same cadence to continue.

However, once a text-based work item (or "text chat") has begun, the complexity of that work item may be observed and differences become apparent. For example, an agent may be presented with ten text chats to process. Each of which has a threshold of response of ten minutes. Accordingly, if the agent spends one minute on each text chat, none of the text chats will exceed their response threshold. However, if one of the chats is observed to have a higher complexity, requiring more "turns" of the agent, more sophisticated actions, and/or more time of the agent, whether the agent him or herself or while waiting for an event so that the agent is able to respond (e.g., waiting for a supervisor to approve an exception), one or more of the other customers will experience a greater response time and may be dissatisfied. As a result, the customer may abandon the text chat and either cease all interactions with the contact center or utilize a more resource intensive channel (e.g., telephone call with a live agent, etc.). As a result, a contact center may be burdened with resources with tasks required to process the text message (e.g., accepting, initial assessment, routing, managing, tracking, etc.), only to have the text chat fail and the customer restart the work item, requiring another round of burdening the processor, but with the even higher resource cost, voice-based work item.

Additionally, agents who process text messages may be assigned other work items utilizing other media. For example, an agent may serially process a number of voice-based work items and in between calls or during lulls in activity with a voice call (e.g., waiting for the customer to access and provide required information or perform an action), the agent may utilize the lull to execute a "turn" on one or more text-based work items. A "turn" comprises a response to a customer from an agent as a component of work item in order to complete the work item. A work item, that has not been abandoned by the customer, requires at least one turn.

In addition to characterizing text chats by several parameters, in another embodiment, a processor; which may be a single processor, processor array, multi-core processor, server, number of servers, etc., analyzes how well the agents handle text chat complexity and can change the complexity of a work item initially and/or throughout the duration of the text chat.

In another embodiment, a maximum complexity (complexity capacity) that an agent can handle may be determined and set. For example, one agent can handle one hundred units of complexity across multiple text chat interactions, such as where, in an airline or travel based contact center, each domestic booking=25 units and each international booking=50 units.

In another embodiment, dynamic scoring of complexity may be determined during or throughout the text chat and be based on message attributes including, but not limited to, use of language (e.g., confusing, conflicting, multi-meaning, erroneous, verbose, etc., versus clear, concise, etc.), coherency (e.g., closely related tasks, such as booking a flight and requesting a special in-flight meal, versus more distantly related tasks, such as booking a flight and requesting a hotel room with a particular view; single task versus multiple tasks; etc.), and/or additional agent effort required to figure out what the customer needs. The chat may be analyzed for language and question within and given an initial complexity score that can be reassessed during the chat as a dynamic complexity score and adjustments thereto. The dynamic portion is based on the system's ability to adjust the complexity scoring up or down by analyzing the text chat while in progress.

In another embodiment, the system analyzes the customer's and/or the agent's conciseness and ability to communicate clearly and cleanly. For example, when there is an order request, the system analysis may check to see if both the agent and the customer are speaking their native language or is one or both speaking a non-native language.

The system during the session may analyze the complexity factor based on the chat details. For example, there can be a different level of complexity assigned to "I'm in Cincinnati, driving to Cleveland, need a flight to Orlando" versus "I need a flight to Orlando."

Complexity is variously embodied and may comprise any one or more of time of a measurement of agent time and/or resource allocation. Complexity may be relative (e.g., work item A requires more time than work item B) or absolute (e.g., work item A requires three minutes of dedicated agent attention, work item B requires two minutes of agent attention of which half of the time can be shared with one or more other tasks, etc.). In another embodiment, complexity is determined by the task itself. For example, booking a domestic flight on a single carrier and returning to the same location is less complex than multiple destinations, which may involve multiple carriers, open-jaw flights, and other additional tasks. In another embodiment, determining the task at hand, may determine, at least in part, the complexity. For example, "You lost my bag" and "I was supposed to board at gate B26, but five minutes before we were to board we had to change to gate C13. Apparently, the flight at B26 was going to Seattle but I was going to Atlanta, which was now at gate C13. So, is my bag in Seattle?"—both illustrate the same task (e.g., locating a bag) but the first is succinct and requires less effort and, therefore, is less complex, than the second task, which is more complex.

Complexity, in another embodiment, may be determined by completeness of information available to the agent. For example, a banking inquiring to a savings account balance may be less complex than determining a brokerage account balance, which may utilize a different login or other connectivity protocols and, therefore, be more complex. Agents may be required to gather certain information which contributes to complexity. For example, a work item where a customer asks for a flight that departs early on the first of next month is less complex than researching a number of flights, such as when a customer wants a flight that leaves on any of a number of days/times but has certain other limitations (e.g., price, connections, etc.). The customer associated with the work item may, with respect to certain embodiments, determine or contribute to complexity. For example, in addition to a level of verboseness, writing styles utilizing complex, confusing, sophisticated, idiomatic, non-standard vocabulary, foreign words, or other writing styles may impart complexity. In another embodiment, certain attributes may be inferred and complexity determined or assumed therefrom. For example, a frequent flyer will likely know how to succinctly state a problem or request whereas a first time flyer may be less succinct.

While analysis of the text portion of a text chat may determine a complexity, in another embodiment, the system may consider other factors including, but not limited to, attached images, multimedia, screen captures, audio feed/recordings, locations, etc., that may be provided or inferred. Also, the organization of the multimedia can be a factor considered by the system as one embodiment of complexity.

In another embodiment, conversational parts may also be considered during analysis. For example, clear dialog turns may have a lower complexity score as compared to a plurality of messages which may supplement or contradict a prior message causing the agent to be unsure which messages are correct or which message should receive attention and/or a response or to respond to a message which was subsequently modified.

In another embodiment, an analysis of conversational parts may determine a predicted number of dialog turns. If the number of predicted dialog turns has been exceeded, the complexity may be increased, such as due to an otherwise undetected verboseness or complexity of the work item. Determining verboseness of a customer may be provided, such as by an assigned agent or an automated agent, by presenting the customer with a banter-type question. The response may be analyzed to gauge how wordy the customer may be. For example, providing a customer with the question: "We have a lot of exciting destinations, where would you like to go?" And, in response, receiving a verbose: "It's too hot, the kids are cranky, need to get a flight to Tampa" versus the more concise, "I need a flight to Tampa." Also, larger vocabularies and non-native speaker cues can be considered since these may take more time.

In another embodiment, after-the-fact scoring based on the complexity of the customer, the complexity of the interaction, and the agent's ability to handle complexity types may be provided and used as feedback, such as to set an initial complexity for a future chat from the same or similar customer, chat subject matter, agent, etc.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.), or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
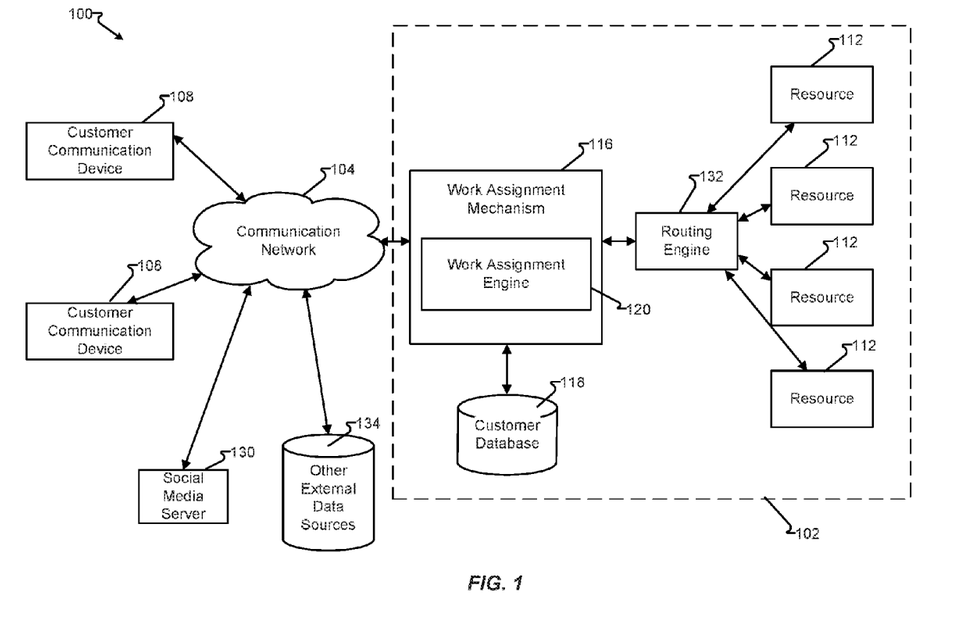
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.), of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
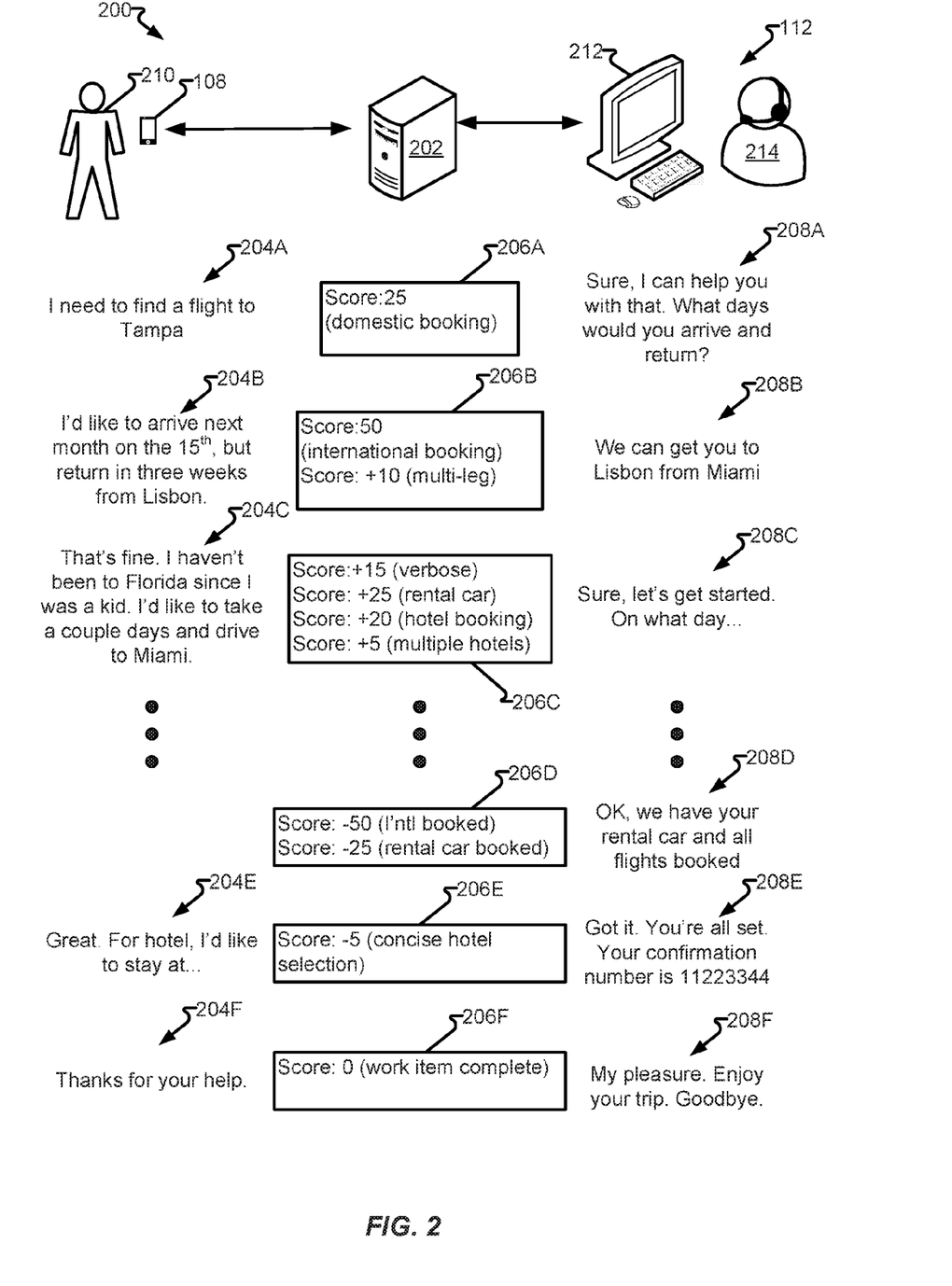
FIG. 2 depicts an interaction in accordance with embodiments of the present disclosure.

FIG. 2 depicts interaction 200 in accordance with embodiments of the present disclosure. interaction 200 illustrates certain components, including a portion of those components described with respect to FIG. 1. However, to avoid unnecessarily complicating the figure, FIG. 2 omits certain components that are either well known or described with respect to FIG. 1. In one embodiment, customer 210 utilizes customer communication device 108, when embodied as or configured for, text-based communications with resource 112, when embodied as human agent 214 configured to communicate, via agent communication device 212, via text. Agent communication device 212 may optionally be configured to utilize other forms of communication (e.g., voice, images/video, co-browsing, etc.), such as to facilitate communications with other customers utilizing text and/or non-text communication devices.

Although communications utilizing server 202 and a communication network (not shown, see FIG. 1, reference 104) require communication nodes, such as client communication device 108 and agent communication device 212, for the sake of simplicity, reference to customer 210, when sending or receiving a text message, shall implicitly include utilization of customer communication device 108. Similarly, reference to agent 214, when sending or receiving a text message, shall implicitly include agent communication device 212. Similarly, other well-known communication components are omitted to avoid unnecessarily complicating the figure.

In one embodiment, customer 210 and agent 214 are engaged in a text-based communication whereby customer 210 provides messages 204 and agent 214 provides messages 208. The communication comprising an interaction component of a work item (e.g., gathering or providing information, performing actions, etc.), to complete a work item. The work item may be limited to a task or task type performed by contact center 102. At a first time, such as upon the initial receipt of a first message from customer 210, server 202 may perform an initial determination as to the complexity associated with a work item associated with the first message. The initial assessment may be a first message, such as message 204A, explicitly stating a task requested, or a more generic conversation initiation message (e.g., "I need help." "This is Ima Customer.", etc.). The initial assessment may determine an initial complexity. Complexity may be based on any one or more datum available at the time of the first assessment (e.g., caller-id, user-id, location, explicit statement, language, idiom usage, jargon usage, grammatical patterns or errors, device type, network type, time/date, destination address, etc.). In another embodiment, a generic complexity may be initially assigned to the work item, such as a default or average complexity associated with all work items or as may be further refined such as, all work items received via text, all work items addressed to a particular destination of a text (e.g., "@internationalbookings.cjet" versus "@domesticbookings.cjet") or other refinement as may be implemented as a matter of design choice.

Customer 210 provides message 204A to agent 214. Message 204A is received and analyzed by server 202 executing instructions. Server 202 is variously embodied and may be a process executing on agent communication device 212, work assignment mechanism 116, work assignment engine 120, routing engine 132, and/or other component operable to receive and analyzes text messages. Server 202 may further be embodied as a communication connectivity device, such as switch, router, etc. Message 204A is assigned a complexity, which may be one or more of a numeric value or other indicator (e.g., high, medium, low; "A," "B," "C"; etc.). Here, server 202 sets the complexity 206 to an initial value (e.g., "25"), or overwrites a prior initial value, due to a word-based analysis determining the work item is associated with booking a domestic flight having a complexity of 25. Agent 214 receives the message and issues response 208A.

The interaction between agent 214 and customer 210 continues. In another embodiment, customer 210 sends message 204B causing server 202 to set complexity 206B (e.g., an overwriting due to new category and an increment), to which agent 214 issues response 208B. Customer 210 sends message 204C, which causes server 202 to set complexity 206C (e.g., incriminations for additional tasks or complexity-influencing customer attributes). To which, agent 214 responds with message 208C. The turns, such as, one of messages 204 that require a response message 208 by agent 214, may continue whereby server 202 continually monitors and updates the complexity of the interaction. The update to the complexity may be up and down or, only up, or only down, as a matter of implementation choice. For example, contact center 102 may wish to increment complexity based on the monitored messages, but not decrement complexity, such as due to an abundance of caution to avoid routing a subsequent work item to the agent only to have an existing message become more complex. Similarly, mathematical equivalence may be implemented without departing form the scope of this disclosure and the embodiments herein. For example, one contact center may increment complexity and then determine the complexity utilized by a particular agent. Another contact center may set a complexity capacity for an agent and decrement the capacity based upon an increase in complexity.

Interaction 200 may continue, such as to decrement complexity 206D by server 202 upon completion of a particular task of the work item. Accordingly, agent 214 may send message 208D identifying portions of the work item that are complete, server 202 then decrements complexity 206D accordingly. Similarly, agent 214 may send message 208E indicating that another task has been completed, causing server 202 to decrement complexity 206E. Finally, as the work item is completed, termination message 208F may be sent causing server 202 to decrement complexity 206F to zero or otherwise remove any remaining complexity. Customer 210 may provide messages, such as messages 204E and 204F to maintain the banter or cadence of the interaction (message 204D is omitted to maintain the sub-elements as indicating a particular agent-customer turn).

As illustrated with respect to interaction 200 an ongoing complexity for an interaction may be maintained. The complexity may utilize a capacity for agent 214, as described with respect to FIG. 3.

Figure 3:
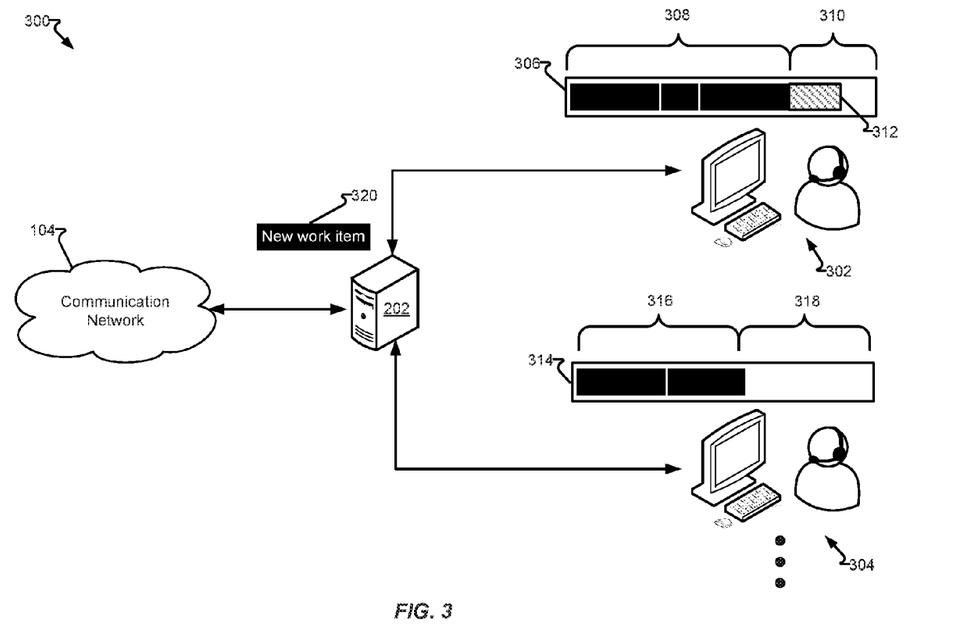
FIG. 3 depicts a second system in accordance with embodiments of the present disclosure.

FIG. 3 depicts system 300 in accordance with embodiments of the present disclosure. In one embodiment, server 202 receives and monitors messages between agents, such as agent 302 and agent 304, and customers connected to communications network 104 to conduct text-based communications. Agent 302 has an associated complexity capacity 306, illustrated in graphical form, to show a maximum amount of complexity agent 302 may handle simultaneously. Work items 308 illustrate current simultaneous work items, such items may be text-based, non-text-based, or a mixture thereof. At a first time, agent 302 may have unutilized capacity 310. However, server 202, in monitoring work items 308, may determine a particular one or more work items 308 now indicates complexity increase 312. As a result, unutilized capacity 310 is reduced by complexity increase 312.

Server 202 may receive new work item 320 having an initial complexity, herein graphically illustrated by its width. While new work item 320 may have been accommodated by unutilized capacity 310, at a first time, the subsequent complexity increase 312 now fails to leave sufficient capacity within unutilized capacity 310. Accordingly, server 202 omits routing new work item 320 to agent 302. Agent 304 having capacity 314 currently utilized by tasks 316 and having unutilized capacity 318 is then selected to receive new work item 320.

It should be appreciated that text-based work items, such as work items 308, 316, and new work item 320, are not enqueued for processing when an agent becomes available. Rather the non-real-time nature of text-based work items allows, and generally requires, simulations processing of a plurality of work items. However, to avoid overloading an agent or causing the agent to be unable to respond to a particular message of a work item in a timely manner, an agent is not presented with more work items than the agent is estimated to be able to process in a time available.

Figure 4:
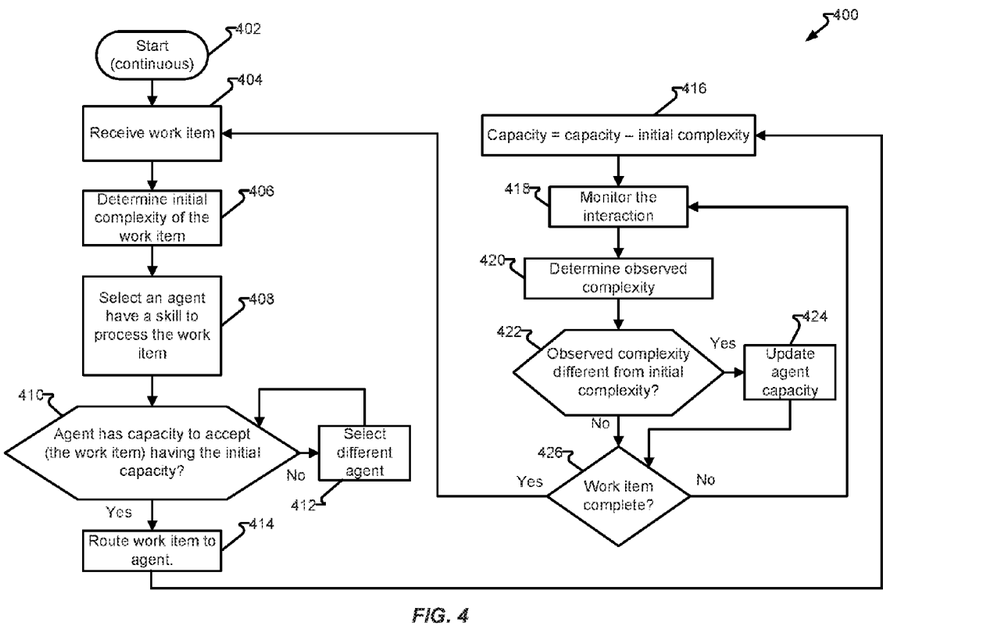
FIG. 4 depicts a process in accordance with embodiments of the present disclosure.

FIG. 4 depicts process 400 in accordance with embodiments of the present disclosure. In one embodiment, process 400 begins at step 402 wherein a work item is received, such as by server 202 receiving a text message from customer 210 utilizing customer communication device 108 and communications network 104. In another embodiment, an agent, such as agent 214 may initiate the work item by sending a first message to customer 210. Step 402 may be ongoing whereby work items are received continually.

Next, step 404 receives a work item (e.g., a single work item or one of a number of work items). Step 406 determines an initial complexity for the work item. As more fully described with respect to FIG. 2, the initial complexity may be based upon one or more datum known at the time step 406 is executed (e.g., destination address, time/date, user id, language, explicit statement, etc.). In another embodiment, step 406 may be a default value, such as for all work items, all text-based work items, or all work items having a particular datum.

An agent is selected in step 408 who has the skills, or other abilities, to process the work item. Step 410 determines if the agent has the capacity to accept the work item, based upon the work item having a complexity set to the initial complexity in step 406. If step 410 is determined in the negative, step 412 is executed and a different agent is selected. Steps 410 and 412 may be executed a number of times until an agent is identified having the capacity to accept the work item having the initial complexity. As can be appreciated, in other embodiments, different selection means may be utilized to select an agent that is both able to process the work item and has the capacity to accept the work item having the initial complexity. Once an agent is selected, step 414 routes the work item to the agent.

Next, step 416 decrements the capacity of the agent by the initial complexity of the work item. As the agent processes the work item, the individual messages within the interaction between the agent and the customer, are monitored in step 418. Step 420 determines an observed complexity and step 422 determines if the observed complexity differs from the initial complexity (or current complexity, if the initial complexity has been previously updated). If step 422 is determined in the affirmative, step 424 updates the agent's capacity. As a result, a subsequent task received in step 404 may be considered for the agent, but upon step 410 utilizing the updated capacity provided by step 424. As a result, work item that is later determined to be more complex leads to the agent's capacity to be updated and thereby avoiding oversubscribing the agent.

Following step 424 or if step 422 is determined in the negative, the work item may be determined in step 426 to be complete. If step 426 is determined in the negative, processing continues back at step 418. If step 426 is determined in the affirmative, process 400 may continue back at step 404 or elsewhere for a subsequent task. Process 400 may continue until terminated, such as by an agent concluding their work shift, and, for example, step 408 no longer selects the agent to receive any work items. As an option, step 426, if determined in the affirmative, may set the complexity of the work item to zero and/or update the agent's capacity to reflect the concluded work item no long has any complexity, at least for the agent, and the agent's capacity is updated accordingly.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). In another embodiment, a processor may be a system or collection of processing components, such as a processor on a client device and a processor on a server, a collection of devices with their own respective processor, or a shared or remote processing service (e.g., "cloud" based processor). A system of processors may comprise task-specific allocation of processing tasks and/or shared or distributed processing tasks.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., processors, memory/storage, interfaces, etc.), of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a processor may comprise a first processor on one component and a second processor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a network interface; and
   a processor; and
   wherein the processor:
   receives a stream of work items via the network interface;
   determines a complexity, for a first work item of the stream of work items, to be a determined first initial complexity;
   routes the first work item to a first agent for processing, the first agent being selected from a pool of agents having a skill necessary to process the first work item and having a capacity to process the first work item, wherein the capacity of the first agent is decremented by the first initial complexity for the first work item;
   monitors the first work item for an observed complexity different from the first initial complexity;
   upon determining the observed complexity differs from the first initial complexity, updates the capacity in accordance with the difference;
   routes a second work item to the first agent upon determining the first agent has a skill and capacity to process the second work item having a second initial complexity that is within the capacity of the first agent; and
   routes the second work item to a second agent upon determining the second initial complexity is not within the capacity.

2. The system of claim 1, wherein the processor increments the capacity in accordance with the work item upon the work item being completed by the first agent.

3. The system of claim 1, wherein, the processor, upon routing the second work item to the first agent, decrements the capacity by a complexity of the second work item.

4. The system of claim 1, wherein, the first work item further comprises a response threshold comprising a required time for the first agent to respond following a customer message comprising the first work item.

5. The system of claim 1, wherein complexity comprises a number of agent-customer turns to complete the first work item.

6. The system of claim 1, wherein complexity comprises a skill level required by an agent processing the first work item.

7. The system of claim 1, wherein the processor updates the capacity in accordance with determining the observed complexity differs from the first initial complexity wherein the update limited to one of an increase or a decrease.

8. The system of claim 1, wherein the processor updates the capacity in accordance with determining the observed complexity differs from the first initial complexity and wherein the update supplants the first initial complexity with the observed complexity.

9. The system of claim 1, wherein the processor updates the capacity in accordance with determining the observed complexity differs from the first initial complexity after a previously determined event has occurred without a subsequent observed complexity differing from the observed complexity.

10. The system of claim 1, wherein the processor updates the capacity in accordance with an aggregate, wherein the aggregate comprises the observed complexity and a subsequent observed complexity, differing from the first initial complexity.

11. A method, comprising:
receiving a stream of work items at a server from a network interface;
determining a complexity, for a first work item of the stream of work items, to be a determined first initial complexity;
routing the first work item to a first agent for processing, the first agent being selected from a pool of agents having a skill necessary to process the first work item and having a capacity to process the first work item, wherein the capacity of the first agent is decremented by the first initial complexity for the first work item;
monitoring the first work item for an observed complexity different from the first initial complexity;
upon determining the observed complexity differs from the first initial complexity, updating the capacity in accordance with the difference;
routing a second work item to the first agent upon determining the first agent has a skill and capacity to accept the second work item for processing, the second work item having a second initial complexity that is within the capacity of the first agent; and
routing the second work item to a second agent upon determining the second initial complexity is not within the capacity of the first agent.

12. The method of claim 11, further comprising incrementing the capacity in accordance with the work item being completed by the first agent.

13. The method of claim 11, further comprising, upon the routing of the second work item to the first agent, decrementing the capacity by a complexity of the second work item.

14. The method of claim 11, wherein complexity comprises a number of agent-customer turns to complete the first work item.

15. The method of claim 11, wherein complexity comprises a skill level required by an agent processing the first work item.

16. A system, comprising:
means for receiving a stream of work items via the network interface;
means for determining a complexity, for a first work item of the stream of work items, to be a determined first initial complexity;
means for routing the first work item to a first agent for processing, the first agent being selected from a pool of agents having a skill necessary to process the first work item and having a capacity to process the first work item, wherein the capacity of the first agent is decremented by the first initial complexity for the first work item;
means for monitoring the first work item for an observed complexity different from the first initial complexity;
means for, upon determining the observed complexity differs from the first initial complexity, updating the capacity in accordance with the difference;
means for routing a second work item to the first agent upon determining the first agent has a skill and capacity to accept the second work item for processing, the second work item having a second initial complexity that is within the capacity of the first agent; and
means for routing the second work item to a second agent upon determining the second initial complexity is not within the capacity.

17. The system of claim 16, wherein the means for updating the capacity in accordance with determining the observed complexity differs from the first initial complexity wherein the means is limited to an update comprising one of an increase or a decrease.

18. The system of claim 16, wherein the means for updating the capacity in accordance with determining the observed complexity differs from the first initial complexity, further comprises, means for updating the first initial complexity with the observed complexity.

19. The system of claim 16, wherein the means for updating the capacity in accordance with determining the observed complexity differs from the first initial complexity, further comprises, means for updating after a previously determined event has occurred without a subsequent observed complexity different from the observed complexity.

20. The system of claim 16, wherein the means for updating the capacity, further comprises, means for updating the capacity in accordance with an aggregate, wherein the aggregate comprises the observed complexity and a subsequent observed complexity, differing from the first initial complexity.

* * * * *